Sept. 1, 1959  E. W. PAXTON  2,902,524
METHOD AND APPARATUS FOR PRODUCING MOLTEN SILICATES
Filed Oct. 26, 1955  2 Sheets-Sheet 1
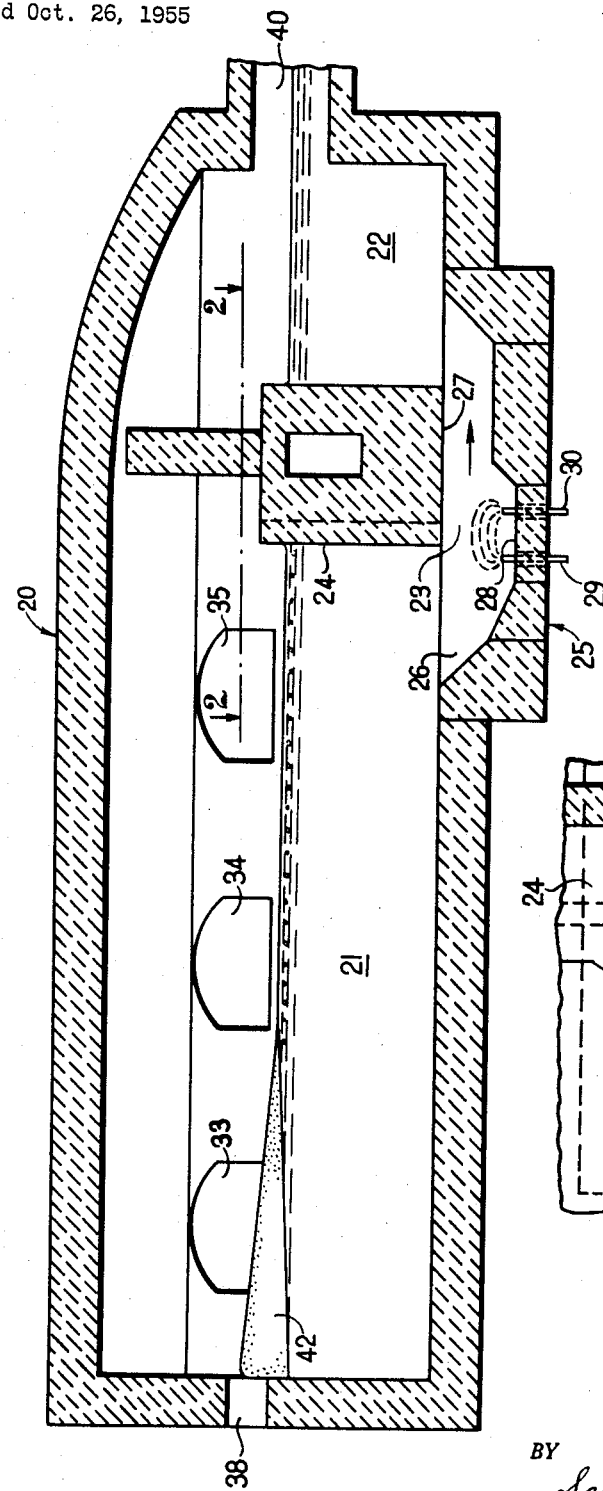
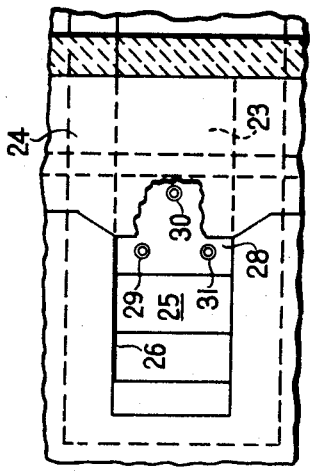
INVENTOR.
Elisha W. Paxton.
BY
Schmieding and Fultz
ATTORNEYS

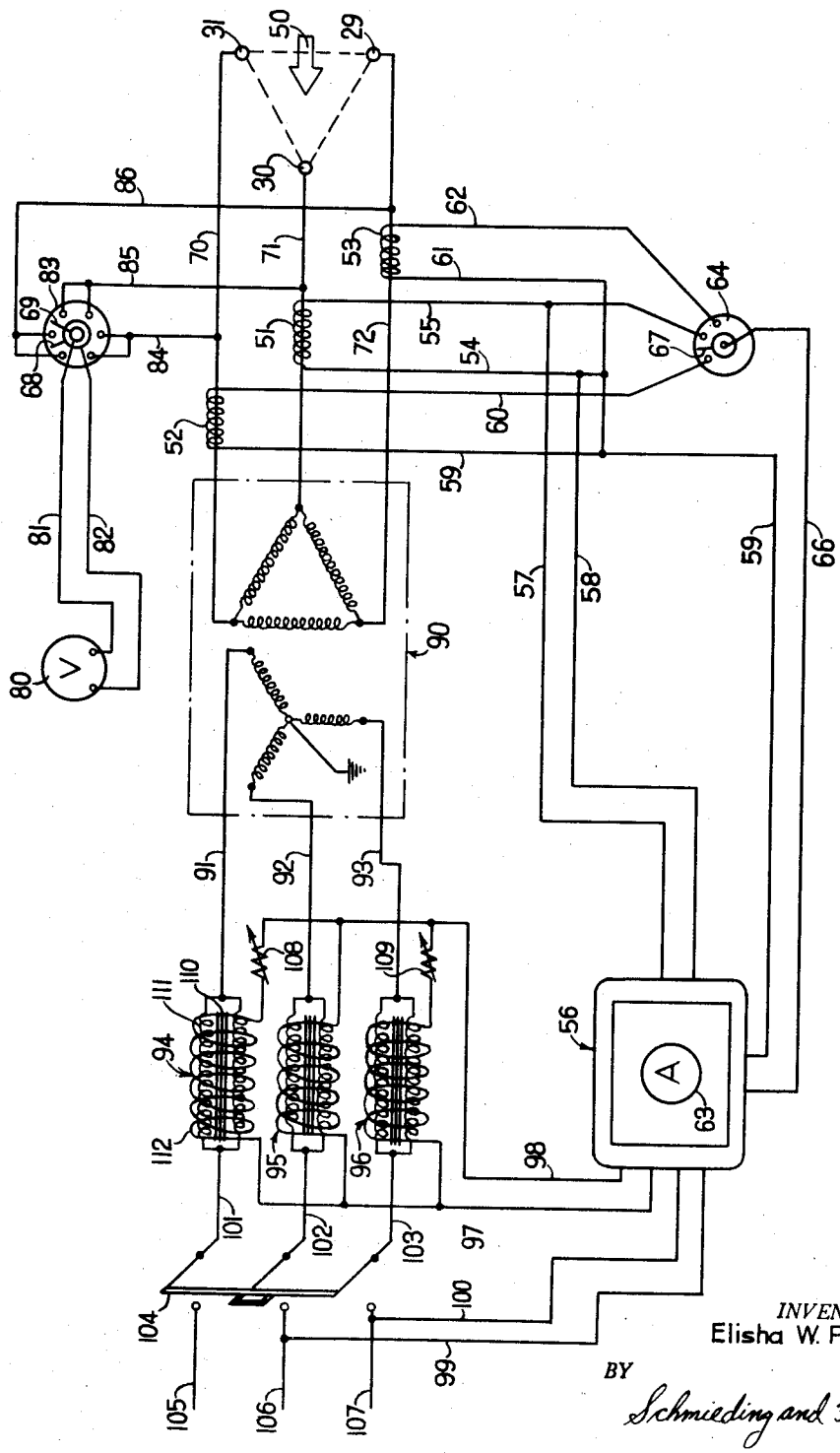

United States Patent Office 2,902,524
Patented Sept. 1, 1959

2,902,524

METHOD AND APPARATUS FOR PRODUCING MOLTEN SILICATES

Elisha W. Paxton, Columbus, Ohio, assignor to Stratabar Process Company, Columbus, Ohio, a partnership Application October 26, 1955, Serial No. 542,906

20 Claims. (Cl. 13—6)

The present invention relates generally to the production of molten silicates and to method and apparatus whereby energy is applied to flowing molten silicates for controlling the flow behavior of the system whereby increased production rates and high quality material are achieved. Such method and apparatus are described in detail in my co-pending applications Serial Number 425,262 and Serial Number 498,258, filed on April 23, 1954 and March 31, 1955 respectively.

In general the process to which the present invention is applied comprises the application of thermal energy at the throat, or submerged passage, of a glass melting furnace to accelerate lower strata flow and thereby prevent hydraulically-induced downward plunging of seed-bearing upper strata to and through the throat. Hence not only is the critical tonnage-limiting factor for the particular furnace increased but also a more homogeneous product and greater fuel firing efficiency are achieved.

With the application of electrical energy to the molten silicates at the throat of the furnace the current is being passed through molten silicates flowing at high rates as compared to the flow rates present in the melting basin. In particular, the present invention relates to method and apparatus for automatically controlling the rate of flow of electric current being applied to such relatively rapidly moving flow of molten silicates with such control being continuously and substantially instantaneously effected in proportion to variations in a selected characteristic of the flowing molten silicates.

Specifically, according to the present invention, for any given and substantially constant voltage, variations in the resistivity responsive to temperature of the molten silicates moving into and through the zone or zones of passage of electric current between electrodes immersed in said molten silicates, cause corresponding variations in circuit resistances and therefore variations in the rate of flow of electric current between said electrodes and thus in the amount of electric power being converted into heat within said molten silicates in unit time while they are in said zones.

Assuming that some constant rate for the consumption of electric power within said molten silicates, and thus a constant rate of heat development, is desirable with particular reference to the lower strata thereof, the most convenient and sensitive way to maintain such power consumption and heat development rates constant is to sense either circuit resistance or current density and to vary the voltage in accordance therewith to maintain power input at a constant rate.

On account of the relationship: rate of heat development equals rate of power expenditure equals product of circuit resistance and current density squared, the greatest leverage as to accuracy is obtained by sensing current density, because as a factor it carries the exponential 2.

Molten silicates may be termed "self-deregulating" as electrical resistors. That is, the hotter they become, the more current they will carry at any given voltage, on account of the decrease of their resistivity with increase in their temperature. Thus, whether or not they are in a static or a flowing state, they strongly tend to consume more electric power and thereby to become still hotter, resulting in a "runaway" condition from the standpoint of electric power consumption and temperature increase. This property is in direct contradistinction to that of metallic resistors in general.

Thus, in absence of concurrent means of heat dissipation, and particularly within the relatively restricted confines of a furnace throat passage, effective control is highly desirable, if not essential, to prevent overheating of the molten silicates to the point of their actual decomposition, or the evolution of their dissolved gases known as "reboil."

The control apparatus of the present invention therefore, instead of attempting to regulate and control electric power input rates by the usual means of sensing temperature, exercises its control by varying input voltage to the throat electrodes in response to varying signals proportionate to current density in the electrode circuit itself.

As an additional feature, the control apparatus of the present invention can be set to operate at various rates of power input whereby control is automatically effected to compensate for fluctuations at the load above and below various power rate datums to provide a constant heating effect at various power input settings. Due to the location of the controlled application of thermal energy at the throat, all of the molten silicates passing to the working basin must pass through a controlled heating zone and hence be subjected to said heating effect which would not be the case were the heating zone located elsewhere in the furnace. Hence the operator of the furnace can vary the temperature of the glass passing to the working basin as it passes through the controlled heating zone and thereby vary its mobility which in turn will vary the output capacity of the furnace.

The effects of the use of electric power in this manner are immediate. Therefore the furnace operator's adjustments of electric power input may be employed to great advantage in eliminating the guess work, uncertainty and waste of fuel heretofore prevalent in attempting to cope with changes in the rate of production required of the furnace. Previous practice has been to try to cope with these changes by changing fuel firing rates, and combustion chamber temperatures, without being able accurately to predict the results, or the heat soaking intervals required.

It is therefore an object of the present invention to provide, in a furnace for producing molten silicates, method and apparatus for thermally influencing the hydraulic behavior of the flow system by applying resistance heating, in an automatically controlled manner, directly at and within the most dynamic and critical portion of the flow system.

It is another object of the present invention to provide, in a melting furnace of the type described, method and apparatus which enable the operator of the furnace to exercise positive and predictable control over the temperature, output rate and quality of the molten silicates when changes in production rates must be made.

Further objects and advantages of the present invention will be apparent from the following description, reference being had to the accompanying drawings wherein a preferred form of embodiment of the invention is clearly shown.

In the drawings:

Figure 1 is a side sectional view of a continuous glass melting furnace to which the present invention is applied;

Figure 2 is a partial broken plan view, partially in section, of the melting furnace of Figure 1, with the section being taken along the line 2—2 of Figure 1; and Figure 3 is a diagrammatic view of a control apparatus constructed according to the present invention and applicable to the melting furnace of the preceding figures.

Referring to the drawings, Figure 1 shows a three-port cross-fired regenerative furnace of the Siemens type, with such furnace being indicated generally at 20. In general, this type of furnace is formed with two basins, connected by one or more submerged passages called "throats."

With reference to Figure 1, furnace 20 includes a melting basin indicated generally at 21, and a working basin indicated generally at 22. A throat or passage, 23, is formed by a so-called "bridge wall" 24, through which the throat apertures passes, and the bottom structure 25 and throat sidewalls 26.

The throat illustrated is of the so-called "drop bottom" type, wherein its bottom is located below that of the melting and working basins, 21 and 22.

It is to be understood that the level of the throat may vary with respect to the levels of the melting and working basins. For example, the bottom structure 25 and lintel 27 may progressively be raised or further lowered, by the designer until the throat aperture 23 is located, within the limits of submergence of its lintel, so that its bottom may be level with, above, or below the levels of the melting basin and/or working basin.

The drop bottom throat illustrated has been altered from the normal design of its type, by providing a depression 28 in its otherwise flat bottom, as deemed to be advantageous, but not necessarily essential when electrodes 29, 30, and 31 are to be inserted into the molten glass in this region.

The molten glass being electrically conductive, and a so-called "Class 2" resistor, it may be heated by causing an electric current to pass through it, due to the "Joule effect," the conversion of electrical energy to thermal energy occurring within the body of the molten glass.

The electrodes illustrated, as to their number and position are arranged for the application of 3-phase alternating electric power, but it is evident that any type of alternating electric power may be applied to any suitable number and pattern of electrode locations in like manner.

Returning to the more general aspects of the furnace, and referring again to Figure 1, the firing ports along one side of the furnace are indicated at 33, 34, and 35.

The furnace is built of ordinary refractory materials in the usual manner, including roof arch, side and end walls, and the basin blocks. The ancillary firing equipment, such as port necks, uptakes, regenerators, flues, reversing valves and stack, being the usual equipment for this type of furnace, are not illustrated.

The unfused raw materials, so-called "batch" are illustrated at 42, having been introduced into the furnace by any suitable conveying means, not illustrated, through an aperture in the furnace superstructure as at 38.

The raw materials, as they are fused into molten glass by the flames from the firing ports, are continuously replenished, thus providing for continuous withdrawal of said molten glass for forming thru another suitable aperture or apertures, as shown by the covered channel 40. The energy of the hydraulic head between basins which results from the withdrawal of molten glass at 40, continuously is expended in causing said molten glass to flow from the melting basin 21, through the throat aperture 23 and into the working basin 22.

Referring now to Figure 3, the same electrode arrangement is represented as in Figures 1 and 2, with the electrodes being correspondingly numbered 29, 30, and 31, respectively, forming the apices of an equilateral triangle.

The arrow 50 indicates the direction of flow of the glass as it approaches and traverses the electrode area.

It should be noted that with this electrode pattern, in conjunction with the indicated direction of glass flow, that the glass will receive its first heating effect from the flow of electric power between electrodes 29 and 31. As it progresses toward electrode 30, it will receive further heating in traversing the power paths 29—30 and 31—30.

Inasmuch as the resistivity of molten glass as an electrolytic conductor decreases as its temperature increases, and in view of the equal lengths of the power paths among electrodes, the circuit resistances of the paths 29—30 and 31—30, not only should be substantially equal, but they should also be lower in value than that of 29—31.

If sensing means for signaling a power control means are to coact with current intensity preferably in only one of the three phase-conductors leading to the electrodes, in order to prevent the development of runaway overheating of the molten glass and overload of the electric power supply equipment, it will now be understood that said sensing means should preferably coact with the phase-conductor 71 leading to electrode 30.

Such sensing means is illustrated in the form of a current transformer 51 with its coil surrounding phase-conductor 71, and with leads 54 and 55 connecting it to control panel 56 by connection with leads 57 and 58 respectively.

Additional current transformers 52 and 53, with their coils surrounding phase-conductors 70 and 72 respectively are provided for the other legs of the 3-phase circuit, with leads 59 and 60 and 61 and 62 respectively, provided selectively to place them in closed circuit with ammeter 63 at control panel 56, by means of rotary switch 64.

For the purpose of connecting any of the current transformers to ammeter 63, a common lead 66 connects it with the movable element 67 of rotary switch 64.

The leads 54 and 61 are connected common with lead 59, which latter is connected to ammeter 63. The leads 55, 60 and 62 are connected to the stationary contacts of rotary switch 64.

In similar manner, voltmeter 80 is connected by leads 81 and 82 to the movable contacts 68 and 69 of rotary switch 83, the stationary contacts of which are connected to phase-conductors 70, 71 and 72 by leads 84, 85 and 86 respectively. By these means, voltmeter 80 selectively may be connected to indicate voltages between phase-conductors 70 and 71, 71 and 72, or 72 and 70.

The case of a conventional Y-delta 3-phase power transformer 90 encloses the necessary windings, at the delta-connected output terminals of which, the load phase conductors 70, 71 and 72 originate.

The Y input terminals of transformer 90 are connected by power phase-conductors 91, 92 and 93 to the output terminals of three variable reactances 94, 95 and 96 respectively, which constitute a suitable means for controlling and regulating the flow of electric power to the electrodes 29, 30 and 31.

Variable reactances indicated generally at 94, 95 and 96 are of the "saturable" type, wherein direct current, furnished by full-wave alternating current rectifiers in control panel 56, is supplied, by leads 97 and 98, to the direct-current coils of saturable reactors 94, 95 and 96, which are here illustrated connected in parallel thereto.

Controller 56, by suitably varying the voltage of the direct current in leads 97 and 98, varies the degree of the magnetic flux saturation in the cores of the reactors, which cores 110 have windings 111 for alternating current, upon which windings 112 for direct current are superimposed.

When the voltage and flow of direct current are maximum, saturation of the reactor cores is maximum and impedance to the flow of alternating current through the apparatus is relatively low. Consequently, the flow of alternating current is also maximum.

The amplitude of the control and regulation of alternating current load voltage thus afforded is ordinarily from 90 percent down to 10 percent of the supply voltage, with expenditure of only 1 percent of the alternating current controlled-power value, as direct current.

The control panel apparatus 56 is shown as receiving its power supply from phase 106—107 of the power supply, by means of leads 99 and 100.

The 3-phase power supply phase-conductors 105, 106 and 107 are connected, through the 3-pole, single-throw switch 104, and the power leads 101, 102 and 103 respectively, to the input terminals of the saturable reactors 94, 95 and 96 respectively.

Variable resistances 108 and 109 may serve to aid in balancing power outputs from the saturable reactors serving electrode circuits 29—30 and 30—31, to obtain approximate phase balance throughout, if desired.

The control panel apparatus 56 is of a type well known to those skilled in the art and serves to furnish variable rectified full-wave direct current voltages to saturable reactors such as 94, 95 and 96, in proportioned response to signals from a current transformer such as 51 proportional to current density, automatically to maintain selected rates of power usage.

In operation, molten glass entering the throat 23, will traverse the electric power path 29—31 as indicated at arrow 50, and subsequently will traverse electric power paths 29—30 or 30—31.

For any given power rate input setting at controller 56, variations in temperature and consequently in resistivity of the molten glass moving across 29—30 or 30—31 will result in corresponding variations in resistances of power paths 29—30 or 30—31, which, in turn, at any given impressed voltage will cause variations in current density as measured in amperes in phase-conductor 71.

Such variations will be proportionately reflected in the output signal of current transformer 51, which signal is transmitted to controller 56.

Controller 56 will then make appropriate adjustment in its output of direct current power to coils 112 of saturable reactors 94, 95 and 96, thus changing the impedance of the latter whereby the flow of alternating current power therethrough is appropriately varied.

Accordingly, when the resistance of power paths 29—30 or 30—31, or both decreases, the power rate to the entire group of electrodes is decreased, and, conversely, if such resistance increases the power rate increases. Hence it will be understood that for any selected setting of controller 56, a corresponding desired heating effect will be applied and automatically maintained at the molten glass as it passes through the region of the electrodes. Moreover, any tendency of the flowing glass to remain too long in the region of power application, and thus to become excessively heated, will be automatically counteracted.

While the form of embodiment of the present invention as herein disclosed constitutes a preferred form, it is to be understood that other forms might be adopted, all coming within the scope of the claims which follow.

I claim:

1. The method of producing silicates which comprises producing molten silicates by melting, passing a flow of said molten silicates through a submerged throat; applying at said throat, thermal energy to said flow; sensing, at said throat, variations in a characteristic of said flow; and varying the rate of application of said thermal energy in proportion to said variations in said characteristic of said flow at said throat.

2. The method of producing silicates which comprises producing molten silicates by melting, flowing said molten silicates through a submerged throat at a rate at which flow from upper strata molten silicates and flow from lower strata molten silicates pass through said throat; applying, at said throat, thermal energy to said flow from lower strata; sensing, at said flow from lower strata, variations in a characteristic of said flow; and varying the rate of application of said thermal energy in proportion to said variations in said characteristic of said flow from lower strata.

3. The method of producing silicates which comprises producing molten silicates by melting, passing a flow of said molten silicates through a submerged throat; passing, at said throat, electric current through said flow to heat said molten silicates by resistance heating; sensing, at said throat, variations in a characteristic of said flow; and varying the rate of flow of said electric current in proportion to said variations in said characteristic of said flow of molten silicates at said throat.

4. The method of producing silicates which comprises producing molten silicates by melting, flowing said molten silicates through a submerged throat at a rate at which flow from upper strata molten silicates and flow from lower strata molten silicates pass through said throat; passing, at said throat, electric current through said flow from lower strata to heat said molten silicates by resistance heating; sensing, at said flow from lower strata, variations in a characteristic of said flow; and varying the rate of flow of said electric current in proportion to said variations in said characteristic of said flow from lower strata.

5. The method of producing silicates which comprises producing molten silicates by melting, passing a flow of said molten silicates through a submerged throat; passing, at said throat, electric current through said flow to heat said molten silicates by resistance heating; sensing, at said throat, variations in the resistance imposed on said electric current by said flow; and varying the rate of flow of said electric current in proportion to said variations in said resistance imposed on said electric current by said flow of molten silicates at said throat.

6. The method of producing silicates which comprises producing molten silicates by melting, flowing said molten silicates through a submerged throat at a rate at which flow from upper strata molten silicates and flow from lower strata molten silicates pass through said throat, passing, at said throat, electric current through said flow from lower strata to heat said molten silicates by resistance heating; sensing, at said flow from lower strata, variations in the resistance imposed on said electric current by said lower strata; and varying the rate of flow of said electric current in proportion to said variations in said resistance imposed on said electric current by said flow from lower strata.

7. A furnace for producing molten silicates comprising, in combination, a first basin; a second basin; submerged passage means connecting said second basin with said first basin for conveying a flow of molten silicates therebetween; heating means located at said passage means for applying thermal energy to said flow; a source of electrical energy for said heating means; control means for the rate of flow of electric current from said source to said heating means; and sensing means located at said passage means for sensing variations in a characteristic of said flow of molten silicates, said control means being operatively connected to said sensing means for effecting control by said control means in proportion to said variations.

8. Apparatus defined in claim 7 characterized by said heating means comprising a plurality of electrodes immersed in said flow of molten silicates.

9. Apparatus defined in claim 7 characterized by said last mentioned means being responsive to variations in said electric current passing between said source and said heating means.

10. Apparatus defined in claim 7 characterized by said heating means comprising a plurality of electrodes immersed in said flow of molten silicates and by said last mentioned means being responsive to variations in the electrical resistance imposed between said electrodes by said flow of molten silicates.

11. A furnace for producing molten silicates comprising, in combination, a first basin; a second basin; submerged passage means connecting said second basin with said first basin for conveying a flow of molten silicates therebetween; heating means located at said passage means for applying thermal energy to the lower strata of said flow; a source of thermal energy for said heating means; control means for the rate of flow of thermal energy from said source to said heating means; and sensing means for sensing variations in a characteristic of said lower strata flow of molten silicates at said passage means for effecting control by said control means in proportion to said variations.

12. Apparatus defined in claim 11 characterized by said heating means comprising a plurality of electrodes immersed in said lower strata of said flow of molten silicates.

13. Apparatus defined in claim 11 characterized by said last mentioned means being responsive to variations in said electric current passing between said source and said heating means.

14. Apparatus defined in claim 11 characterized by said heating means comprising a plurality of electrodes immersed in said lower strata of said flow of molten silicates and by said last mentioned means being responsive to variations in the electrical resistance imposed between said electrodes by said lower strata of said flow of molten silicates.

15. A furnace for producing molten silicates comprising, in combination, a first basin; a second basin; submerged passage means connecting said second basin with said first basin for conveying a flow of molten silicates therebetween; heating means located at said passage means for applying thermal energy to said flow; a source of electrical energy for said heating means; control means for the rate of flow of electric current from said source to said heating means; and means responsive to variations in a characteristic of said flow of molten silicates for effecting control by said control means in proportion to said variations, said heating means comprising a plurality of electrodes immersed in said silicates and producing a plurality of paths of electric current flowing through said flow of molten silicates, and said means responsive to variations in the characteristics of said flow being responsive to variations in the resistance of certain of said paths located downstream in said flow of molten silicates relative to certain other of said paths.

16. A furnace for producing molten silicates comprising, in combination, a first basin; a second basin; submerged passage means connecting said second basin with said first basin for conveying a flow of molten silicates therebetween; heating means located at said passage means for applying thermal energy to the lower strata of said flow; a source of electrical energy for said heating means; control means for the rate of flow of electric current from said source to said heating means; and means responsive to variations in a characteristic of said flow of molten silicates for effecting control by said control means in proportion to said variations, said heating means comprising a plurality of electrodes immersed in said silicates and producing a plurality of paths of electric current flowing through said flow of molten silicates, and said means responsive to variations in the characteristics of said flow being responsive to variations in the resistance of certain of said paths located downstream in said flow of molten silicates relative to certain other of said paths.

17. The method of producing silicates which comprises producing molten silicates by melting, passing a flow of said molten silicates through a submerged throat; applying, at said throat, thermal energy to said flow, said application of thermal energy being concentrated at the entrance to said throat; and varying the rate of application of said thermal energy in proportion to said variations in said characteristic of said flow at said throat.

18. The method of claim 17 characterized by applying said thermal energy by Joule effect.

19. A furnace for producing molten silicates comprising, in combination, a first basin; a second basin; submerged passage means connecting said second basin with said first basin for conveying a flow of molten silicates therebetween; heating means located at the entrance to said passage means for applying thermal energy to said flow; a source of electrical energy for said heating means; control means for the rate of flow of electric current from said source to said heating means; and sensing means located at said passage means for sensing variations in a characteristic of said flow of molten silicates, said control means being operatively connected to said sensing means for effecting control by said control means in proportion to said variations.

20. Apparatus defined in claim 19 characterized by said heating means comprising a plurality of electrodes immersed in said flow of molten silicates.

References Cited in the file of this patent
UNITED STATES PATENTS

| | | |
|---|---|---|
| 1,349,363 | Colby | Aug. 10, 1920 |
| 1,349,391 | Thornton | Aug. 10, 1920 |
| 1,944,855 | Wadman | Jan. 23, 1934 |
| 2,158,135 | MacFarlane | May 16, 1939 |
| 2,158,136 | MacFarlane | May 16, 1939 |
| 2,249,993 | Upton | July 22, 1941 |
| 2,283,188 | Cornelius | May 19, 1942 |
| 2,512,761 | Arbeit | June 27, 1950 |
| 2,516,570 | Hartwig et al. | July 25, 1950 |
| 2,636,914 | Arbeit | Apr. 28, 1953 |
| 2,707,717 | Seymour | May 3, 1955 |